(12) United States Patent
Chen (10) Patent No.: US 9,466,139 B2
(45) Date of Patent: Oct. 11, 2016

(54) MAP OBTAINING METHOD

(71) Applicants: Inventec (Pudong) Technology Corporation, Shanghai (CN); INVENTEC CORPORATION, Taipei (TW)

(72) Inventor: Li-Te Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 63 days.

(21) Appl. No.: 14/687,147

(22) Filed: Apr. 15, 2015

(65) Prior Publication Data
US 2016/0155250 A1    Jun. 2, 2016

(30) Foreign Application Priority Data
Nov. 27, 2014   (CN) .......................... 2014 1 0707246

(51) Int. Cl.
*G06T 11/20* (2006.01)
*G06T 3/40* (2006.01)

(52) U.S. Cl.
CPC .................. *G06T 11/206* (2013.01)

(58) Field of Classification Search
CPC .................................................. G06T 11/206
See application file for complete search history.

(56) References Cited

U.S. PATENT DOCUMENTS

| | | | | |
|---|---|---|---|---|
| 4,899,293 A * | 2/1990 | Dawson | ................ | G01C 21/00 340/990 |
| 8,463,299 B1 * | 6/2013 | Hladik, Jr. | ............ | H04W 4/021 345/660 |
| 2002/0188702 A1 * | 12/2002 | Short, III | ............... | G01C 21/36 709/220 |
| 2008/0052638 A1 * | 2/2008 | Frank | ................. | G06K 9/00476 715/808 |
| 2008/0056538 A1 * | 3/2008 | Frank | .................... | G06F 3/0481 382/113 |
| 2011/0280453 A1 * | 11/2011 | Chen | ..................... | G06T 7/0046 382/113 |
| 2011/0282570 A1 * | 11/2011 | Tanioka | ............. | G01C 21/3676 701/532 |
| 2012/0249583 A1 * | 10/2012 | Nishiyama | ............. | G01C 21/30 345/629 |
| 2015/0154773 A1 * | 6/2015 | Cosenza | ................ | G01C 21/20 345/619 |

FOREIGN PATENT DOCUMENTS

JP        2006113509 A     *    4/2006

OTHER PUBLICATIONS

Sally M. Benson, Carbon Dioxide Capture for Storage in Deep Geologic Formations—Results from the CO2 Capture Project, 2005, Elsevier, p. 1051.*

* cited by examiner

*Primary Examiner* — Jeffery A Brier
(74) *Attorney, Agent, or Firm* — Maschoff Brennan (57) ABSTRACT

A method for obtaining a map comprises: capturing a map image from a physical map, obtaining a plurality of geographical coordinates corresponding to a plurality of reference points from one of the physical map and the map image, calculating a corresponding geographical coordinate of each pixel in the map image, and embedding a relationship between each pixel and its corresponding geographical coordinate into the map image.

16 Claims, 9 Drawing Sheets

MAP OBTAINING METHOD

CROSS-REFERENCE TO RELATED APPLICATIONS

This non-provisional application claims priority under 35 U.S.C. §119(a) on Patent Application No. 201410707246.2 filed in China on Nov. 27, 2014, the entire contents of which are hereby incorporated by reference.

BACKGROUND OF THE INVENTION

1. Technical Field of the Invention

The present invention relates to a method for obtaining a map, particularly to a method for obtaining a map to extend a map database.

2. Description of the Related Art

A navigation device is an electronic device using global positioning system (GPS) signals and combining an electronic map for path navigation or direct navigation, wherein direct navigation only labels the direction and the distance of the destination. Generally, these navigation devices are required to be installed with maps through the official standard procedures, such as buying the officially released electronic map or using a software program to covert a third-party electronic map to a recognizable format and importing the converted map to the device.

Due to the various needs of different users, there are also some professional maps in the market, such as contour maps for mountain climbing and even guiding maps for the tourist areas. These maps contain the information which is not included in the built-in electronic map of the navigation device, and these maps are also possibly not available to be combined into the officially released maps. Obtaining these maps in advance and importing them into the navigation device through software is also inconvenient.

SUMMARY OF THE INVENTION

A method for obtaining a map by using an electronic device illustrated in one embodiment of the present invention includes capturing a map image from a physical map, obtaining a plurality of geographic coordinates corresponding to a plurality of reference points from one of the physical map and the map image, calculating a corresponding geographic coordinate of each pixel in the map image according to the plurality of geographic coordinates corresponding to the plurality of reference points and a plurality of pixels corresponding to the plurality of reference points, and embedding the corresponding geographic coordinate of each pixel into the map image.

In an embodiment of the present invention, the method further includes obtaining a plurality of corresponding coordinates from a built-in map of the electronic device according to the plurality of geographic coordinates corresponding to the plurality of reference points, and interpolating the map image into the built-in map according to the plurality of reference points and the plurality of corresponding coordinates.

In an embodiment of the present invention, the step of interpolating the map image into the built-in map includes building a coordinate transformation matrix according to the plurality of pixels corresponding to the plurality of reference points and the plurality of pixels corresponding to the plurality of corresponding coordinates, converting the map image to a normalized map with the coordinate transformation matrix, and interpolating the normalized map into the built-in map according to the plurality of corresponding coordinates.

In an embodiment of the present invention, the method further includes calculating a scale in association with the map image according to the plurality of reference points.

In an embodiment of the present invention, the plurality of reference points are the coordinates of at least three corners in the physical map.

In an embodiment of the present invention, each of the plurality of reference points is the coordinate of one of a plurality of landmarks in the map image.

In an embodiment of the present invention, the step of obtaining the plurality of geographic coordinates corresponding to a plurality of reference points from one of the physical map and the map image includes executing an image recognition procedure to one of the physical map or the map image to recognize a barcode block therein, and decoding the barcode block to obtain the plurality of geographic coordinates corresponding to the plurality of reference points.

In an embodiment of the present invention, the step of obtaining the plurality of geographic coordinates corresponding to a plurality of reference points from one of the physical map and the map image includes executing an image recognition procedure to one of the physical map or the map image to recognize a plurality of latitude and longitude coordinate blocks therein, and executing a character recognition procedure to the plurality of latitude and longitude coordinate blocks to obtain the plurality of geographic coordinates corresponding to the plurality of reference points.

In an embodiment of the present invention, the method further includes recognizing at least one road image block in the map image to update a road database of the built-in map.

In an embodiment of the present invention, the step of recognizing at least one road image block in the map image includes recognizing at least one line in the map image as a road according to a road location in the built-in map, and recognizing the at least one road image block in the map image according to a feature of the at least one line.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

An embodiment of the present invention is adapted for a electronic device with global positioning system (GPS). For example, the electronic device may comprise an image capturing device and a processor, which may be a navigation device, a positioning device, or a portable device with the GPS function, such as a smart phone, a tablet, a notebook, or any portable device with arithmetic functions, but not limited thereto.

Figure 1:
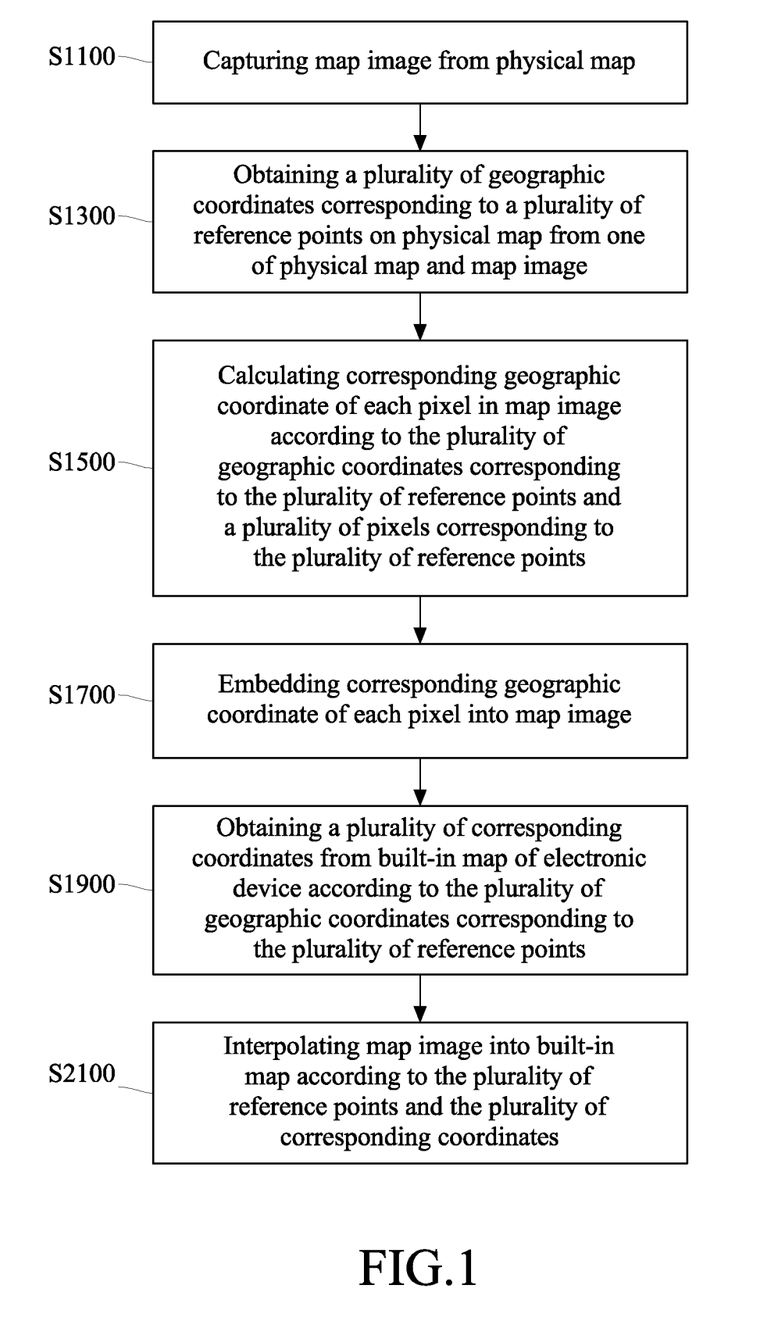
FIG. 1 is a flowchart of the method for obtaining a map according to an embodiment of the present invention.

Please refer to FIG. 1. FIG. 1 is a flowchart of the method for obtaining a map according to an embodiment of the present invention. As shown in FIG. 1, the method for obtaining a map includes the following steps. As shown in the step S1100, a map image is captured from a physical map. As shown in the step S1300, a plurality of related geographic coordinates corresponding to a plurality of reference points are obtained from the physical map or the map image. As shown in the step S1500, the geographic coordinate corresponding to each pixel in the map image is calculated according to the plurality of geographic coordinates and a plurality of pixels corresponding to the plurality of reference points. As shown in the step S1700, the geographic coordinate corresponding to each pixel is embedded into the map image. Therefore, a map image adapted for the positioning system is obtained.

Figure 2A:
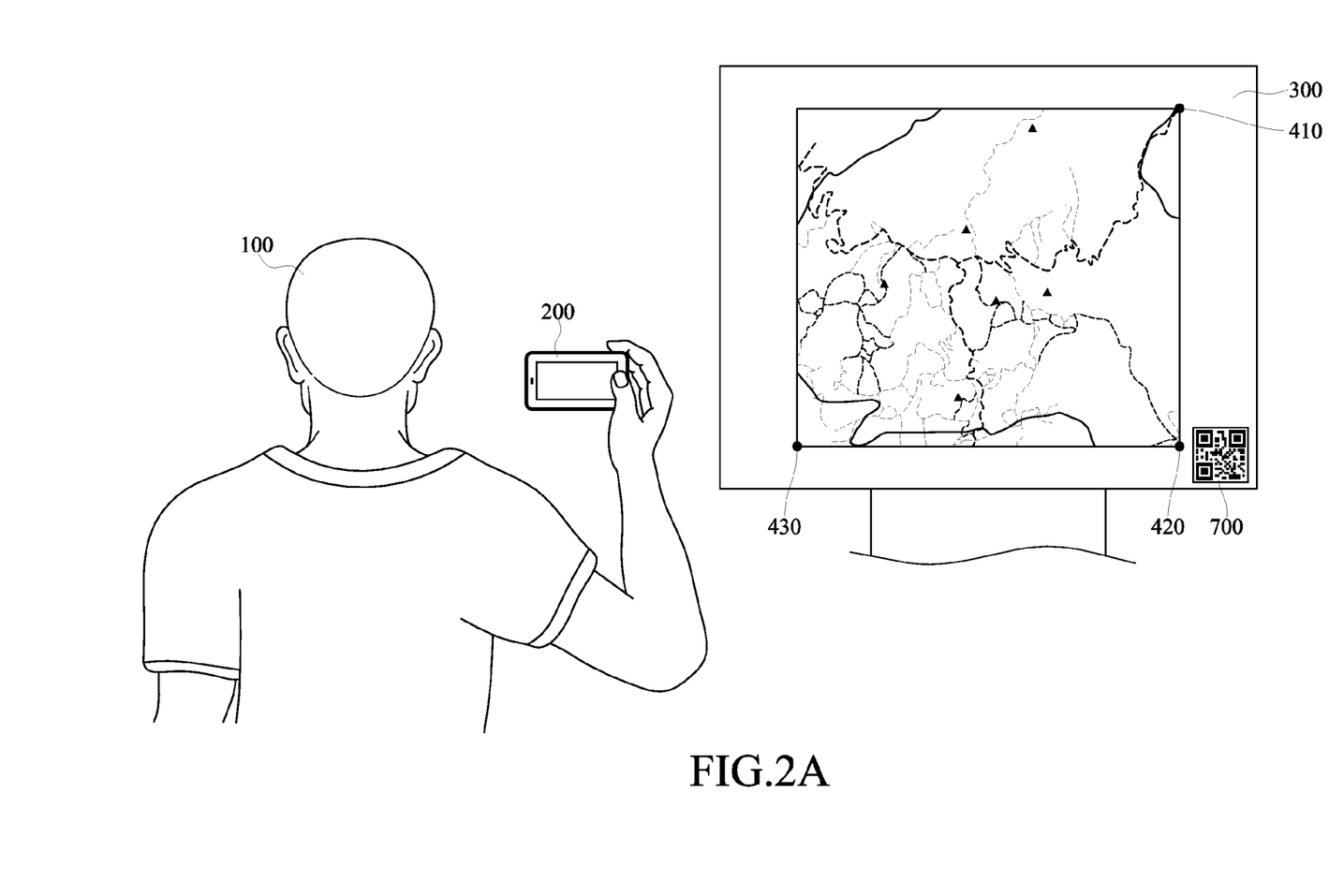
FIG. 2A is a diagram of the step S1100 according to an embodiment of the present invention.
Figure 2B:
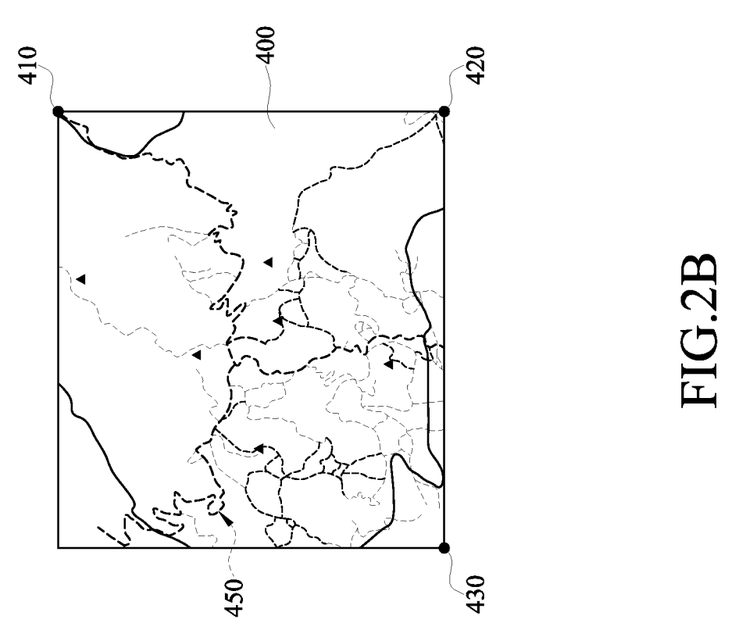
FIG. 2B is a diagram of the captured map image in FIG. 2A.

For example, please refer to FIG. 2A to FIG. 2B. FIG. 2A is a diagram of the step S1100 according to an embodiment of the present invention. FIG. 2B is a diagram of the captured map image in FIG. 2A. As shown in FIG. 2A, the user 100 uses the built-in image capturing module of the positioning device 200 to capture a map image from the physical map 300. In another embodiment, the user 100 captures the map image from the physical map 300 with a camera and sends the map image to a positioning device through wired or wireless transmission. The captured map image 400 is shown in FIG. 2B. The built-in processing module of the positioning device 200 obtains the geographic coordinates corresponding to the reference coordinate 410, the reference coordinate 420, and the reference coordinate 430 from the map image 400. The geographic coordinate is but not limited to the latitude and longitude coordinate. In addition, the positioning device 200 is also available for the user to key in the geographic coordinates corresponding to the reference coordinate 310, the reference coordinate 320, and the reference coordinate 330 according to the carried information of the physical map 300. In spite of the example of the three reference points, however, the reference points of another embodiment include but not limited to the two diagonal reference points of the map image 400, the four reference points of the four corners, or the reference points of a plurality of famous landmarks.

In association with the implementation of the step S1500 in certain embodiments, taking FIG. 2B for example, the map image 400 is an image of 800×600 in resolution. In other words, the pixel in FIG. 2B is between (1,1) and (800,600). The geographic coordinate, namely, the latitude and longitude coordinate corresponding to the reference coordinate 410 is (N 25°12'29", E 121°38'54") and the corresponding pixel is (800,600). The geographic coordinate, namely, the latitude and longitude coordinate corresponding to the reference coordinate 420 is (N 25°08'14", E 121°38'54") and the corresponding pixel is (800,1). The geographic coordinate, namely, the latitude and longitude coordinate corresponding to the reference coordinate 430 is (N 25°08'14", E 121°30'10") and the corresponding pixel is (1,1). According to the three pixels, the processing module of the positioning device 200 determines that the captured map image 400 is a rectangle. In other words, the relationship between any pixel and the corresponding latitude and longitude coordinate is a system of linear equations, so the built-in processing module of the positioning device 200 calculates the corresponding latitude and longitude coordinate corresponding to each pixel (x,y) in the map image 400 according to the data of the reference coordinate 410 and the data of the reference coordinate 430 among the aforementioned three coordinates with the following equations:

longitude=E 121°30'10"+(121° 38'54"–E 121°30'10")*(x−1)/799 latitude=N 25°08'14"+(N 25° 12'29"–N 25°08'14")*(y−1)/599

The aforementioned equations stands for the relationship equations between the pixel and the latitude and longitude coordinate in the map image 400.

In the step S1700, the processing module of the positioning device 200 directly connects each pixel in the map image 400 with the corresponding latitude and longitude coordinate and also stores the aforementioned equations in the positioning device 200 for the further calculation whenever necessary.

Figure 2C:
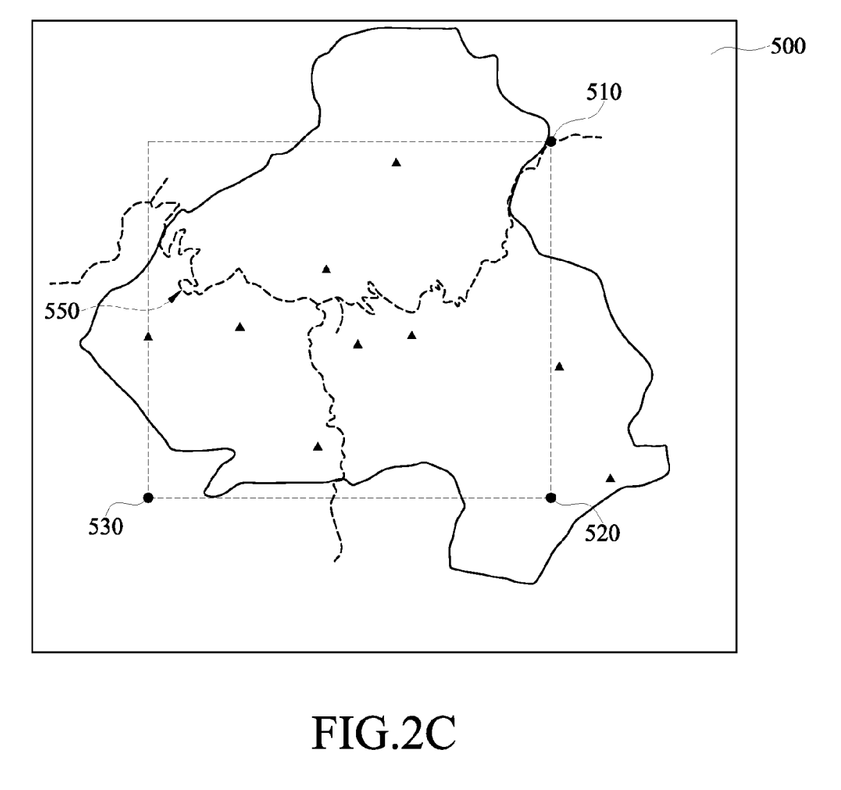
FIG. 2C is a partial diagram of the built-in map which is not updated according to an embodiment of the present invention.
Figure 2D:
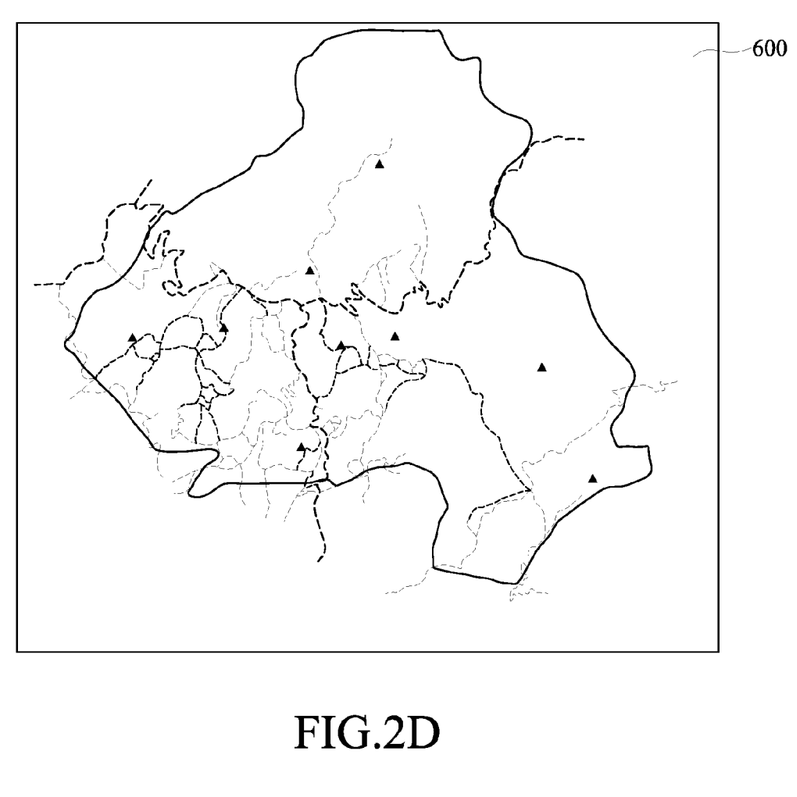
FIG. 2D is a partial diagram of the updated built-in map in the step S2100 according to an embodiment of the present invention.

In addition, please refer back to FIG. 1. In another embodiment, the method of obtaining a map further includes the step S1900 and S2100. As shown in the step S1900, the positioning device 200 obtains a plurality of corresponding coordinates from the built-in map of the positioning device 200 according to the plurality of geographic coordinates corresponding to the plurality of reference points. As shown in the step S2100, the map image is interpolated into the built-in map according to the plurality of reference points and the plurality of corresponding coordinates. Specifically, please refer to FIG. 2C and FIG. 2D. FIG. 2C is a partial diagram of the built-in map which is not updated according to an embodiment of the present invention. FIG. 2D is a partial diagram of the updated built-in map in the step S2100 according to an embodiment of the present invention. As shown in FIG. 2C, the positioning device 200 finds out the three corresponding coordinates having the same latitude and longitude coordinates in the built-in map 500, namely, the corresponding coordinate 510, the corresponding coordinate 520, and the corresponding coordinate 530. Next, the positioning device 200 interpolates the map image 400 into the built-in map 500. Specifically, the interpolation indicates overlapping the reference location of the reference coordinate 410 in the map image 400 with the corresponding location of the corresponding coordinate 510 in the built-in map 500, overlapping the reference location of the reference coordinate 420 in the map image 400 with the corresponding location of the corresponding coordinate 520 in the built-in map 500, and overlapping the reference location of the reference coordinate 430 in the map image 400 with the corresponding location of the corresponding coordinate 530 in the built-in map 500. Therefore, the map in FIG. 2D is created.

Figure 3:
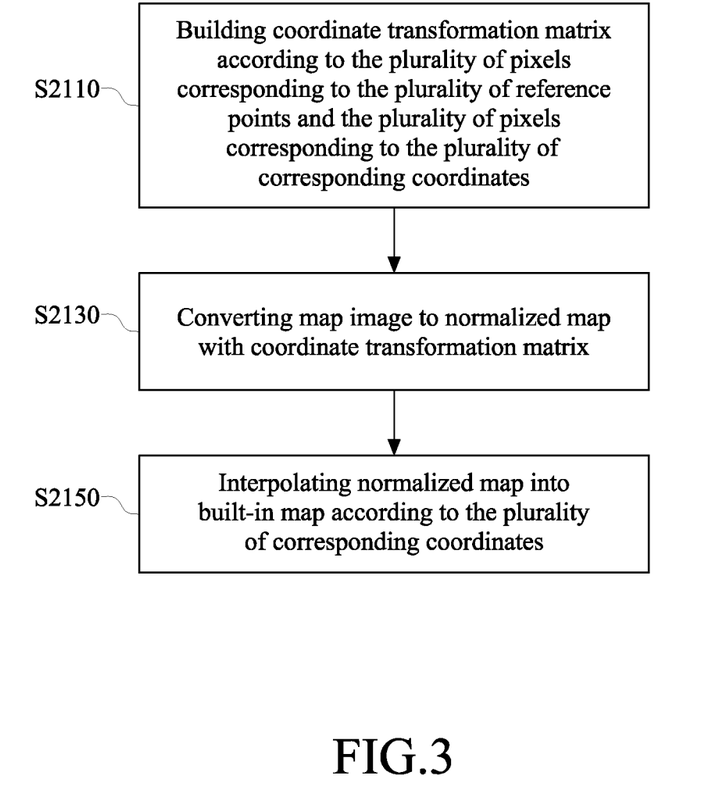
FIG. 3 is a flowchart of the step S2100 according to an embodiment of the present invention.

In an embodiment of the present invention, please refer to FIG. 3. FIG. 3 is a flowchart of the step S2100 according to an embodiment of the present invention. As shown in FIG. 3, the step S2100 includes the following steps: as shown in the step S2110, a coordinate transformation matrix is built according to both the plurality of pixels corresponding to the plurality of reference points and the plurality of pixels corresponding to the plurality of corresponding coordinates. Next, as shown in the step S2130, the map image is converted to the normalized map with the coordinate transformation matrix. As shown in the step S2150, the normalized map is interpolated into the built-in map according to the plurality of corresponding coordinates.

The details of the step S2110 to the step S2150 are specifically described in the following explanations. Generally, the shape of the physical map 300 is a rectangle and when the user 100 holds the positioning device 200, and the map image 400 captured by the built-in image capturing module is usually not a rectangle. In other words, because of the relationship of the relative locations between the user 100 and the physical map 300, the map image 400 is deformed compared to the physical map 300. Therefore, the captured map image 400 is needed to be normalized for being interpolated into the built-in map 500. The normalization of the map image 400 is to adjust the shape of the map image 400 to a rectangle.

Figure 4A:
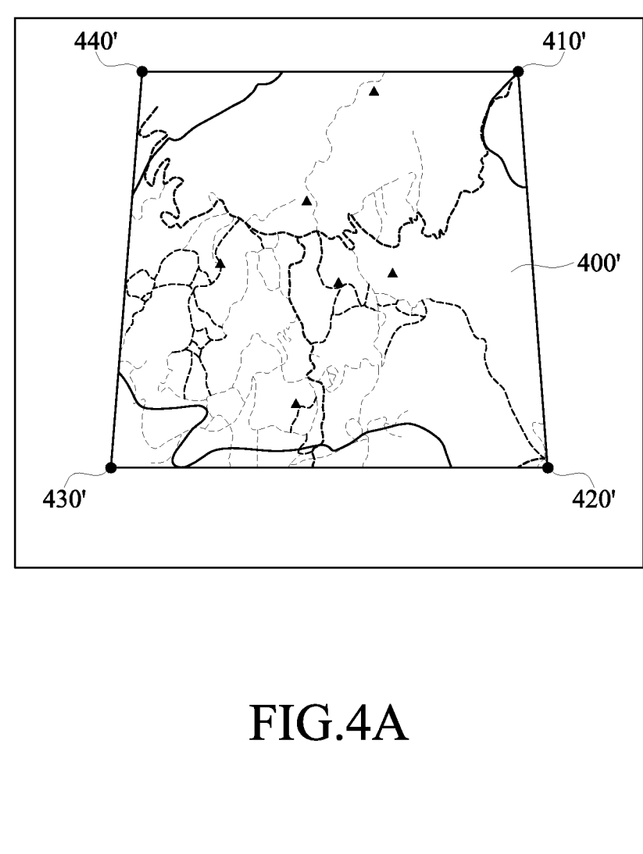
FIG. 4A is a diagram of the deformed map image according to an embodiment of the present invention.
Figure 4B:
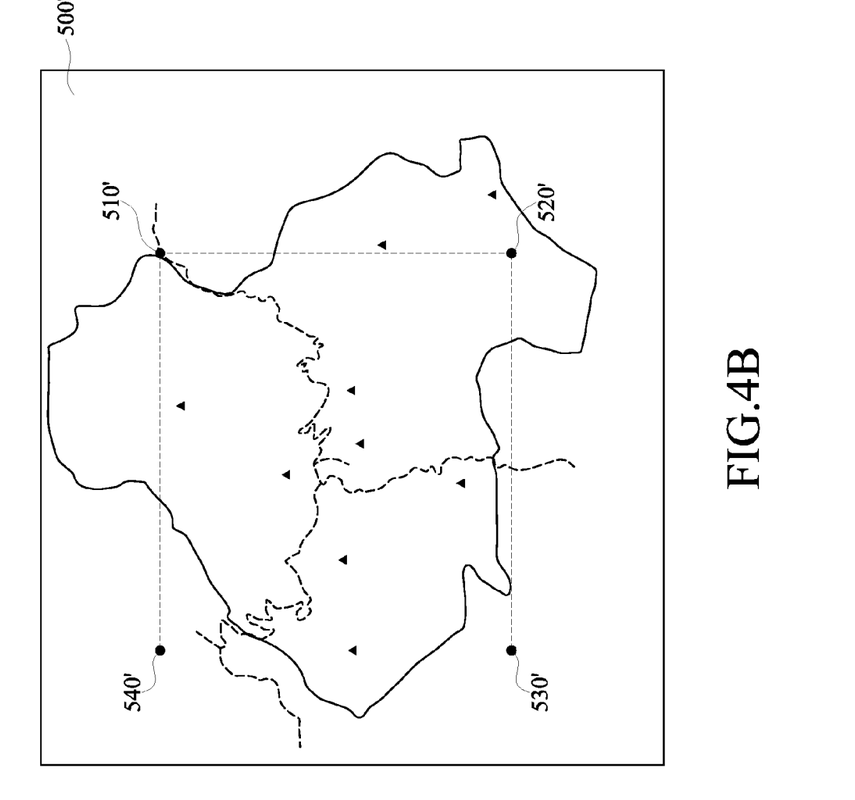
FIG. 4B is a partial diagram of the built-in map according to an embodiment of the present invention.

Specifically, please refer to FIG. 4A and FIG. 4B. FIG. 4A is a diagram of the deformed map image according to an embodiment of the present invention. FIG. 4B is a partial diagram of the built-in map according to an embodiment of the present invention. As shown in FIG. 4A, the map image 400' includes a reference coordinate 410', a reference coordinate 420', a reference coordinate 430', and a reference coordinate 440'. The map image 400' is in an image of 800×600 in resolution and every pixel in the image is deemed a coordinate point. For example, the coordinate point of lower left corner in the image is (1,1), and the coordinate point of upper right corner in the image is (800,600), and therefore the pixels corresponding to the reference coordinate 410' to 440' in the image are (700,500), (790,100), (10,100), and (100,500) respectively. Meanwhile, the pixels corresponding to the reference coordinate 510', the reference coordinate 520', the reference coordinate 530', and the reference coordinate 540' in the built-in map 500' are (7000,5000), (7000,4700), (6600,4700), and (6600,5000) respectively. Therefore, a coordinate transformation matrix is obtained according to the pixels corresponding to the four reference points and the other pixels corresponding to the four reference points. The map image 400' is normalized and interpolated into the built-in map 500' according to the coordinate transformation matrix, so that the reference coordinate 410' overlaps the reference coordinate 510', and the reference coordinate 420' overlaps the reference coordinate 520', and the reference coordinate 430' overlaps the reference coordinate 530', and the reference coordinate 440' overlaps the reference coordinate 540'. In addition, in an embodiment of the present invention, the aforementioned method further calculates a scale related to the map image 400' according to the reference points 410' to 440'.

Figure 5:
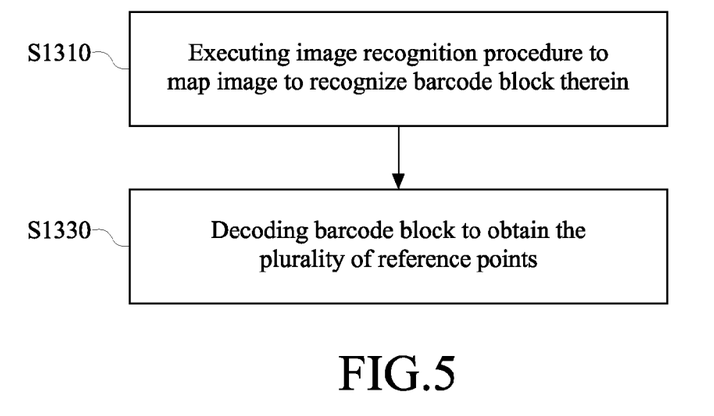
FIG. 5 is a flowchart of the step S1300 according to an embodiment of the present invention.

In another embodiment of the present invention, in association with the detailed implementation of the step S1300, please refer to FIG. 5. FIG. 5 is a flowchart of the step S1300 according to an embodiment of the present invention. As shown in FIG. 5, the step S1300 includes the following steps: as shown in the step S1310, an image recognition procedure is executed to the map image to recognize a barcode block in the map image, such as the two-dimensional barcode 700 in FIG. 2A. As shown in the step S1330, the barcode block is decoded to obtain the plurality of reference points. In other words, the data related to the reference points in the map image are digitized and displayed with the barcode block. For example, the barcode of the barcode block is but not limited to one-dimensional barcode, two-dimensional barcode, high capacity color barcode, or other barcode adapted for being scanned to display information. The one-dimensional barcode is but not limited to Code39 and Modified Plessey. The two-dimensional barcode is but not limited to quick response code (QR code), Chinese-sensible code, data matrix, and PDF417 barcode. In association with the reference points in the stored map image, the following is an example for explaining the details. When the reference points are located on the four corners of the map image, namely, the reference coordinate 410' to the reference coordinate 440' in FIG. 4A, the storage format of the reference coordinate is shown as Table 1. The information 「11」 indicates that the reference coordinate is located on the upper right corner, and the information 「10」 indicates that the reference coordinate is located on the lower right corner, and the information 「00」 indicates that the reference coordinate is located on the lower left corner, and the information 「01」 indicates that the reference coordinate is located on the upper left corner. However, Table 1 is only an example. The storage format of the barcode block is not limited to the previous explanation and is designed according to the need of the designer.

TABLE 1

| 11 | (N 25° 12'29", E 121° 38'54") |
| 10 | (N 25° 08'14", E 121° 38'54") |
| 00 | (N 25° 08'14", E 121° 30'10") |
| 01 | (N 25° 12'29", E 121° 30'10") |

Figure 6:
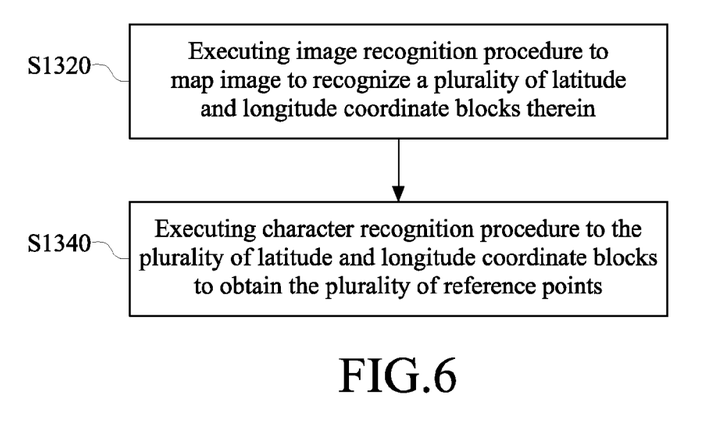
FIG. 6 is a flowchart of the step S1300 according to another embodiment of the present invention.

In another embodiment of the present invention, in association with the detailed implementation of the step S1300, please refer to FIG. 6. FIG. 6 is a flowchart of the step S1300 according to another embodiment of the present invention. As shown in FIG. 6, the step S1300 includes the following steps: as shown in the step S1320, an image recognition procedure is executed to the map image to recognize a plurality of latitude and longitude coordinate blocks in the map image. As shown in the step S1340, a character recognition procedure is executed to the plurality of latitude and longitude coordinate blocks to obtain the plurality of reference points. The labeling method for the latitude and longitude coordinate is but not limited to the degree-minute-second format in the previous example or the format of degrees with decimal points. The character recognition procedure applies the techniques of image recognition and optical character recognition (OCR) and is not further explained hereinafter.

Figure 7:
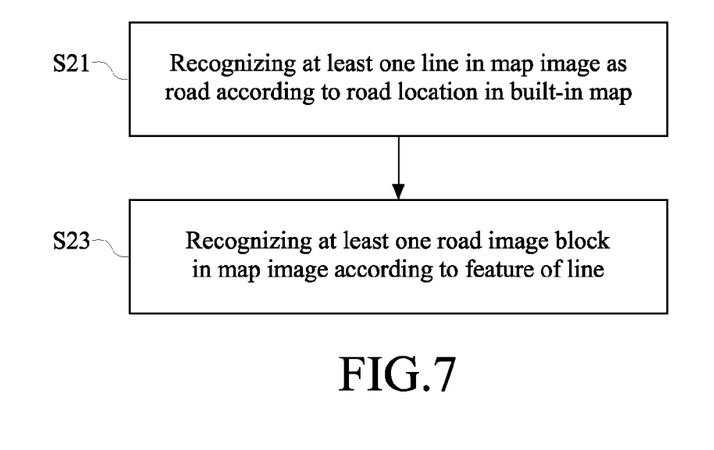
FIG. 7 is a flowchart of part of the method according to an embodiment of the present invention.

In an embodiment of the present invention, the method for obtaining a map further includes recognizing at least one road image block in the map image to update a road database of the built-in map. In association with the implementation, please refer to FIG. 7. FIG. 7 is a flowchart of part of the method according to an embodiment of the present invention. As shown in FIG. 7, the step of the present embodiment includes the following detailed steps: as shown in the step S21, at least one line is recognized in the map image as a road according to the road location in the built-in map. As shown in the step S23, at least one road image block is recognized in the map image according to a feature of the at least one line.

In practice, please refer back to FIG. 2B to FIG. 2D. Because the property of the line 550 in the built-in map 500 stored in the storage unit of the positioning device 200 is set to a road, namely, the passable area for pedestrians and vehicles when the positioning device 200 is for navigation. When the map image 400 is interpolated into the built-in map 500, in the updated built-in map 600, the processing unit of the positioning device 200 discovers that the line 450 in the map image 400 overlaps the line 550 in the built-in map 500, and the distance between the two lines is less than an error tolerance value. Therefore, the processing unit of the positioning device 200 recognizes one or a plurality of lines having the same features with the line 450 as the roads, wherein the features are, for example, colors, dash line patterns, or textures. Consequently, the updated built-in map 600 obtained by interpolating the map image 400 into the built-in map 500 has more road image blocks than the original built-in map 500. Specifically, more roads are in the updated built-in map 600 available for the positioning device 200 to select the path for pedestrians and vehicles when the positioning device 200 is for navigation.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for obtaining a map by using an electronic device, comprising:
   capturing a map image from a physical map;
   obtaining a plurality of geographic coordinates corresponding to a plurality of reference points on the physical map from one of the physical map and the map image;
   calculating a corresponding geographic coordinate of each pixel in the map image according to the plurality of geographic coordinates corresponding to the plurality of reference points and a plurality of pixels corresponding to the plurality of reference points; and
   embedding the corresponding geographic coordinate of each pixel into the map image.

2. The method of claim 1, further comprising:
   obtaining a plurality of corresponding coordinates from a built-in map of the electronic device according to the plurality of geographic coordinates corresponding to the plurality of reference points; and
   interpolating the map image into the built-in map according to the plurality of reference points and the plurality of corresponding coordinates.

3. The method of claim 2, wherein the step of interpolating the map image into the built-in map comprises:
   building a coordinate transformation matrix according to the plurality of pixels corresponding to the plurality of reference points and the plurality of pixels corresponding to the plurality of corresponding coordinates;
   converting the map image to a normalized map with the coordinate transformation matrix; and
   interpolating the normalized map into the built-in map according to the plurality of corresponding coordinates.

4. The method of claim 3, wherein the step of obtaining the plurality of geographic coordinates corresponding to a plurality of reference points from one of the physical map and the map image comprises:
   executing an image recognition procedure to one of the physical map or the map image to recognize a barcode block therein; and
   decoding the barcode block to obtain the plurality of geographic coordinates corresponding to the plurality of reference points.

5. The method of claim 3, wherein the step of obtaining the plurality of geographic coordinates corresponding to a plurality of reference points from one of the physical map and the map image comprises:
   executing an image recognition procedure to one of the physical map or the map image to recognize a plurality of latitude and longitude coordinate blocks therein; and
   executing a character recognition procedure to the plurality of latitude and longitude coordinate blocks to obtain the plurality of geographic coordinates corresponding to the plurality of reference points.

6. The method of claim 3, further comprising recognizing at least one road image block in the map image to update a road database of the built-in map.

7. The method of claim 6, wherein the step of recognizing at least one road image block in the map image comprises:
   recognizing at least one line in the map image as a road according to a road location in the built-in map; and
   recognizing the at least one road image block in the map image according to a feature of the at least one line.

8. The method of claim 2, wherein the step of obtaining the plurality of geographic coordinates corresponding to a plurality of reference points from one of the physical map and the map image comprises:
   executing an image recognition procedure to one of the physical map or the map image to recognize a barcode block therein; and
   decoding the barcode block to obtain the plurality of geographic coordinates corresponding to the plurality of reference points.

9. The method of claim 2, wherein the step of obtaining the plurality of geographic coordinates corresponding to a plurality of reference points from one of the physical map and the map image comprises:
   executing an image recognition procedure to one of the physical map or the map image to recognize a plurality of latitude and longitude coordinate blocks therein; and
   executing a character recognition procedure to the plurality of latitude and longitude coordinate blocks to obtain the plurality of geographic coordinates corresponding to the plurality of reference points.

10. The method of claim 2, further comprising recognizing at least one road image block in the map image to update a road database of the built-in map.

11. The method of claim 10, wherein the step of recognizing at least one road image block in the map image comprises:
    recognizing at least one line in the map image as a road according to a road location in the built-in map; and
    recognizing the at least one road image block in the map image according to a feature of the at least one line.

12. The method of claim 1, further comprising calculating a scale in association with the map image according to the plurality of reference points.

13. The method of claim 1, wherein the plurality of reference points are the coordinates of at least three corners in the physical map.

14. The method of claim 1, wherein each of the plurality of reference points is the coordinate of one of a plurality of landmarks in the map image.

15. The method of claim 1, wherein the step of obtaining the plurality of geographic coordinates corresponding to a plurality of reference points from one of the physical map and the map image comprises:
- executing an image recognition procedure to one of the physical map or the map image to recognize a barcode block therein; and
- decoding the barcode block to obtain the plurality of geographic coordinates corresponding to the plurality of reference points.

16. The method of claim 1, wherein the step of obtaining the plurality of geographic coordinates corresponding to a plurality of reference points from one of the physical map and the map image comprises:
- executing an image recognition procedure to one of the physical map or the map image to recognize a plurality of latitude and longitude coordinate blocks therein; and
- executing a character recognition procedure to the plurality of latitude and longitude coordinate blocks to obtain the plurality of geographic coordinates corresponding to the plurality of reference points.

* * * * *